United States Patent
Lee-Baron et al.

(10) Patent No.: US 11,466,995 B2
(45) Date of Patent: Oct. 11, 2022

(54) SYSTEMS, COMPUTING DEVICES, AND METHODS FOR INDICATING A GEOGRAPHIC LOCATION OF TRANSPORTATION FOR A USER

(71) Applicant: Lenovo Enterprise Solutions (Singapore) Pte. Ltd., New Tech Park (SG)

(72) Inventors: Jennifer Lee-Baron, Research Triangle Park, NC (US); Nathan Peterson, Research Triangle Park, NC (US); Gary Cudak, Research Triangle Park, NC (US)

(73) Assignee: Lenovo Global Technology (United States) Inc., Morrisville, NC (US)

( * ) Notice: Subject to any disclaimer, the term of this patent is extended or adjusted under 35 U.S.C. 154(b) by 296 days.

(21) Appl. No.: 16/916,892

(22) Filed: Jun. 30, 2020

(65) Prior Publication Data
US 2021/0404822 A1  Dec. 30, 2021

(51) Int. Cl.
*G01S 19/42* (2010.01)
*G01C 21/34* (2006.01)
*G01C 21/36* (2006.01)
*G08G 1/123* (2006.01)

(52) U.S. Cl.
CPC ..... *G01C 21/3453* (2013.01); *G01C 21/3407* (2013.01); *G01C 21/3661* (2013.01); *G01S 19/42* (2013.01); *G08G 1/123* (2013.01)

(58) Field of Classification Search
CPC ............ G01C 21/3453; G01C 21/3407; G01C 21/3661; G01S 19/42; G08G 1/123
USPC ........................................................ 701/428
See application file for complete search history.

(56) References Cited

U.S. PATENT DOCUMENTS

2016/0298974 A1 * 10/2016 Newlin ................ G08G 1/0141
2017/0030717 A1 * 2/2017 Azami ................... G01S 19/49

* cited by examiner

Primary Examiner — Harry K Liu
(74) Attorney, Agent, or Firm — Olive Law Group, PLLC

(57) ABSTRACT

Systems, computing devices, and methods for indicating a geographic location of transportation for a user are disclosed. According to an aspect, a method includes determining an approximate time when a user is expected to use a mode of transportation. The method also includes determining an estimated time to travel from a current geographic location of the user to a current geographic location of the mode of transportation. Further, the method includes presenting, via a computing device of the user, a message at a time based on the determined approximate time and the determined estimated time.

20 Claims, 6 Drawing Sheets

SYSTEMS, COMPUTING DEVICES, AND METHODS FOR INDICATING A GEOGRAPHIC LOCATION OF TRANSPORTATION FOR A USER

TECHNICAL FIELD

The presently disclosed subject matter relates generally to transportation. Particularly, the presently disclosed subject matter relates to systems, computing devices, and methods for indicating a geographic location of transportation for a user.

BACKGROUND

Navigation applications have been developed for assisting computer or other electronic device users to travel to specified destinations. As an example, a navigation application may be opened on a user's smartphone and used to assist the user with driving to a particular city or street address. Once a city or street address is specified, the navigation application may provide the user with direction prompts for reaching the destination. For example, the navigation application may present to the user instructions or directions for driving to the destination. The instructions or directions may be provided audibly by the smartphone's speakers (e.g., voice instructions), via a map displayed on the smartphone's display, and/or via text display on the smartphone's display. Further, the user may select for the navigation to present walking directions, rather than driving directions, for reaching the destination.

In some instances, a driver may need assistance with finding her or his parked automobile. This may be, for example, when the driver has parked the automobile in a large parking area (e.g., parking area with multiple parking decks) or in a city area. After a time, the driver may forget specifically where the automobile is parked. Some navigation applications allow the driver to "drop breadcrumbs" when leaving the automobile, so that the driver may be later guided back to the parked automobile by the breadcrumbs. However, this technique requires the driver to proactively interact with the application to instruct the application to "drop the breadcrumbs" when leaving the parked automobile. Therefore, there is a continuing need for improved systems and techniques for assisting a driver to find his or her parked automobile or other transportation.

BRIEF DESCRIPTION OF THE DRAWINGS

Figure 1:
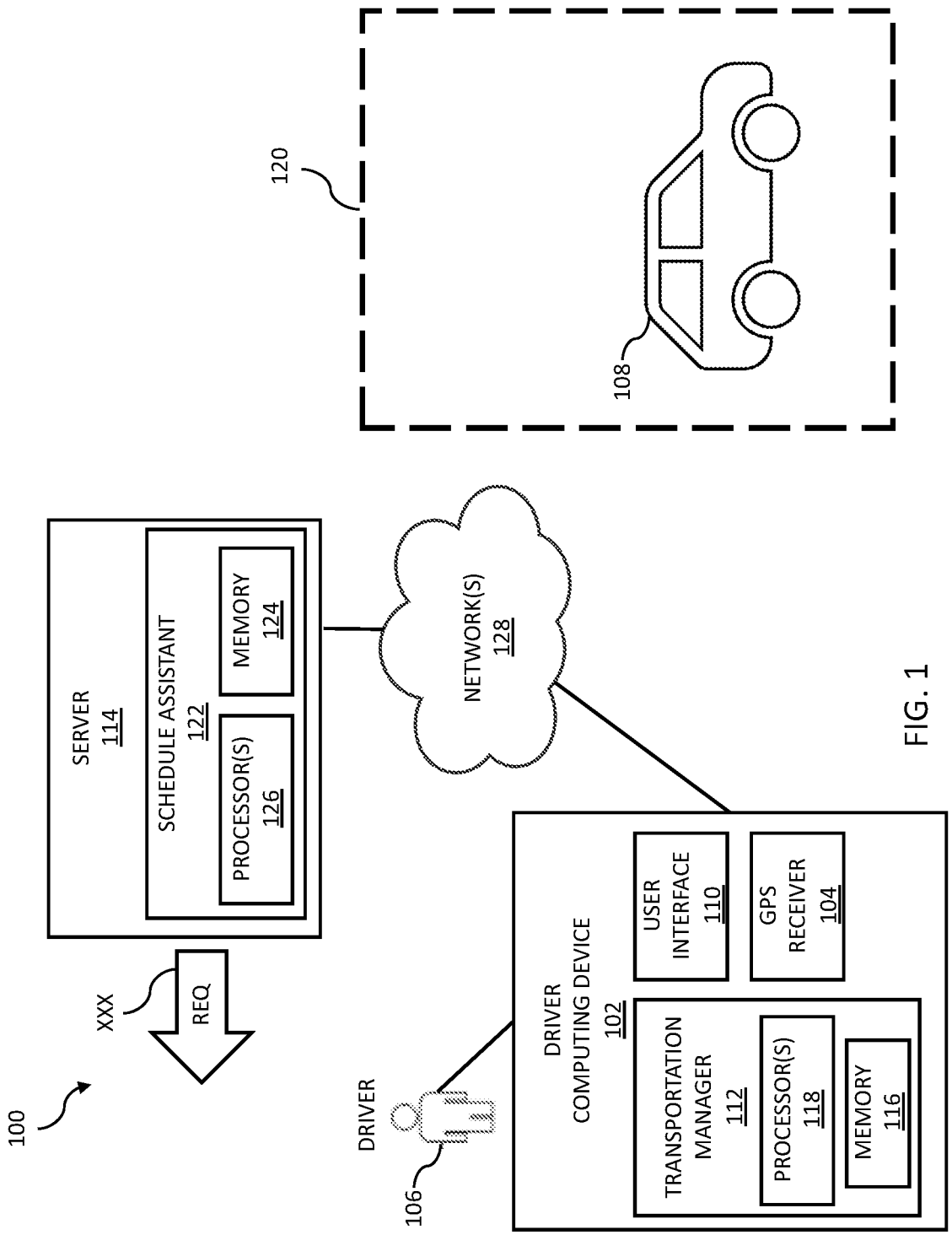
Figure 2:
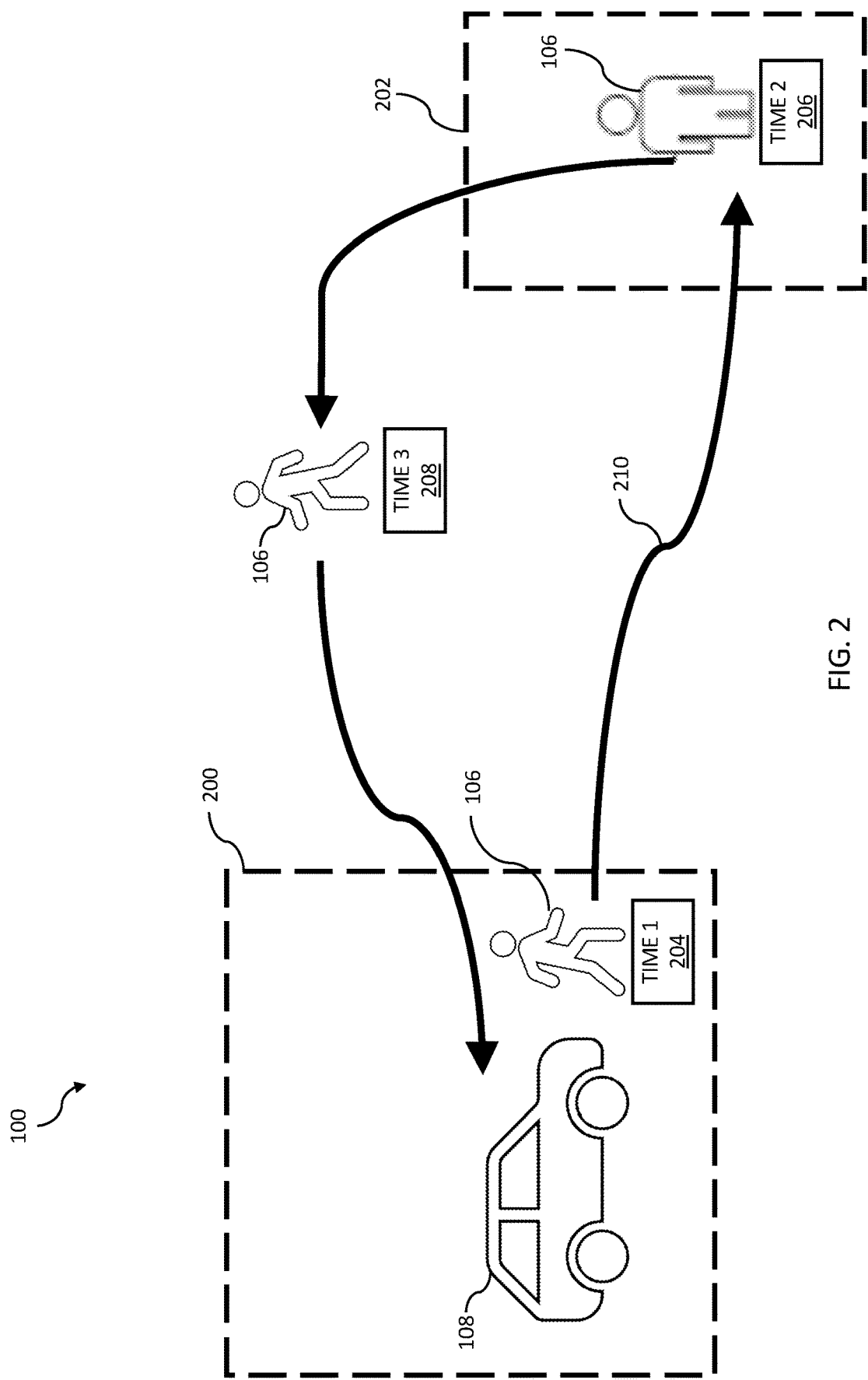
Figure 3:
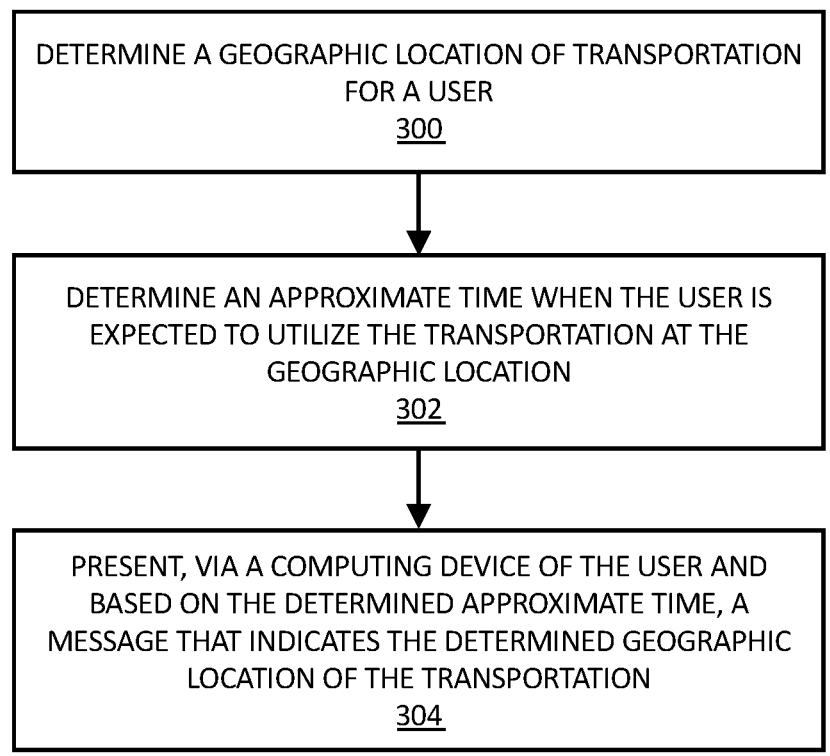
Figure 4:
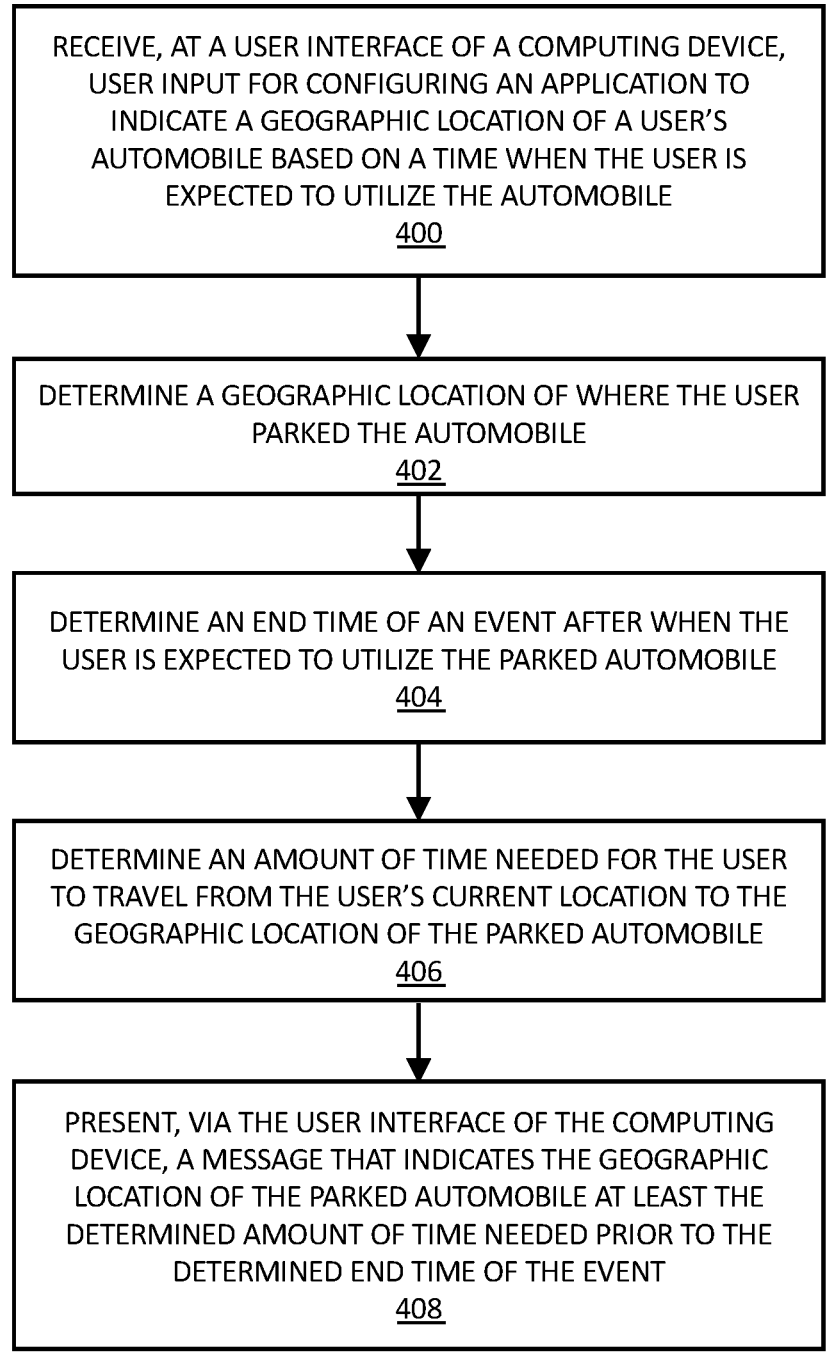
Figure 5:
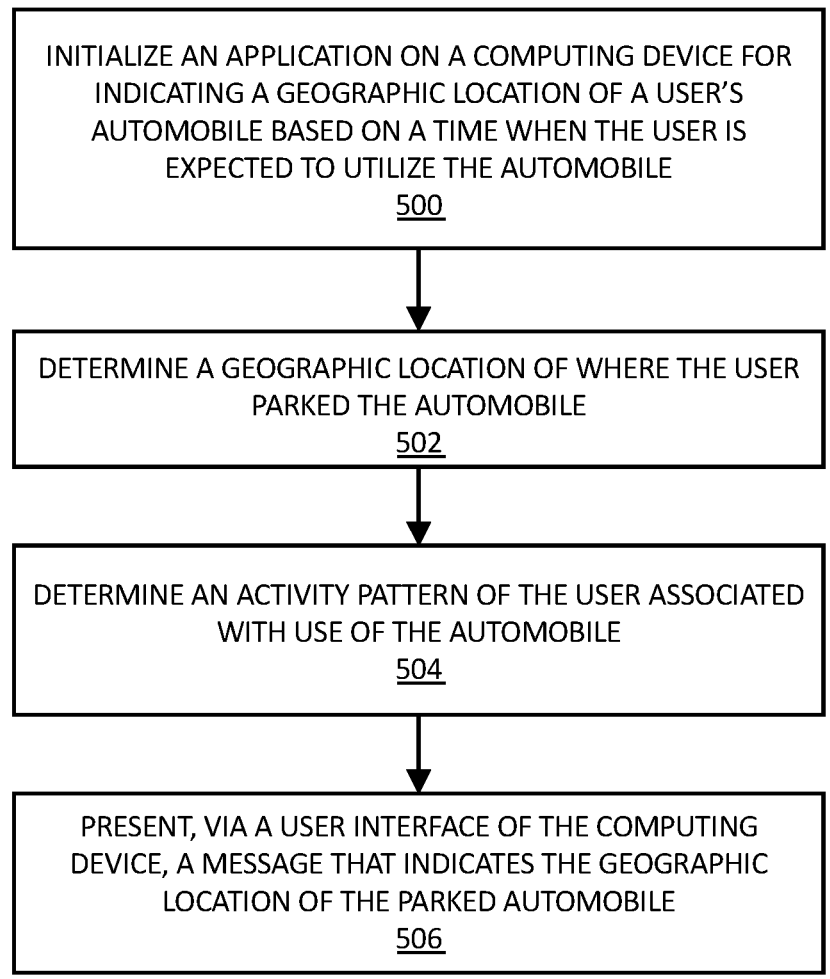
Figure 6:
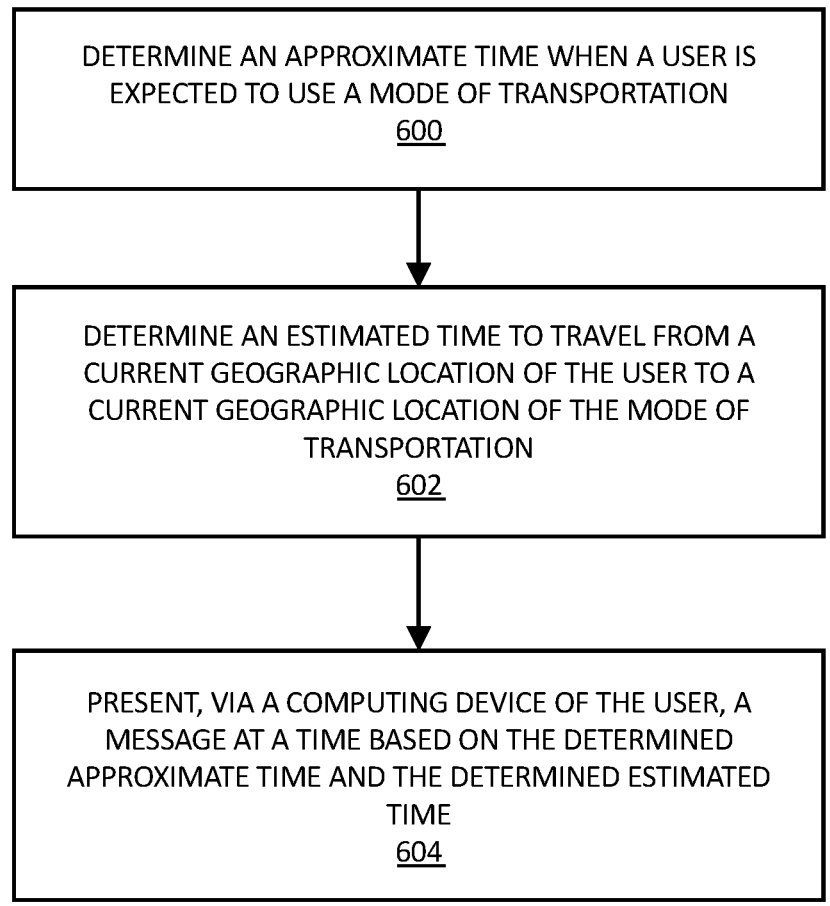

Having thus described the presently disclosed subject matter in general terms, reference will now be made to the accompanying Drawings, which are not necessarily drawn to scale, and wherein:

FIG. 1 is a block diagram of a system for indicating a geographic location of transportation for a user based on a time when the user is expected to utilize the transportation in accordance with embodiments of the present disclosure;

FIG. 2 is a diagram showing an example scenario of the driver having parked the automobile at geographic location, walked to a destination, and subsequently returned to the automobile in accordance with embodiments of the present disclosure;

FIG. 3 is a flow diagram of a method for indicating a geographic location of transportation for a user based on a time when the user is expected to utilize the transportation in accordance with embodiments of the present disclosure;

FIG. 4 is a flow diagram of a method for indicating a geographic location of transportation for a user based on a time when the user is expected to utilize the transportation in accordance with embodiments of the present disclosure;

FIG. 5 is a flow diagram of a method for indicating a geographic location of transportation for a user based on an activity pattern of the user in accordance with embodiments of the present disclosure; and FIG. 6 is a flow diagram of a method for notifying a user when to travel to a mode of transportation in accordance with embodiments of the present disclosure.

SUMMARY

The presently disclosed subject matter includes systems, computing devices, and methods for indicating a geographic location of transportation for a user. According to an aspect, a method includes determining an approximate time when a user is expected to use a mode of transportation. The method also includes determining an estimated time to travel from a current geographic location of the user to a current geographic location of the mode of transportation. Further, the method includes presenting, via a computing device of the user, a message at a time based on the determined approximate time and the determined estimated time.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, "an element" means at least one element and can include more than one element.

"About" and "approximate" are used to provide flexibility to a numerical endpoint by providing that a given value may be "slightly above" or "slightly below" the endpoint without affecting the desired result.

The use herein of the terms "including," "comprising," or "having," and variations thereof is meant to encompass the elements listed thereafter and equivalents thereof as well as additional elements. Embodiments recited as "including," "comprising," or "having" certain elements are also contemplated as "consisting essentially of" and "consisting" of those certain elements.

Recitation of ranges of values herein are merely intended to serve as a shorthand method of referring individually to each separate value falling within the range, unless otherwise indicated herein, and each separate value is incorporated into the specification as if it were individually recited herein. For example, if a range is stated as between 1%-50%, it is intended that values such as between 2%-40%, 10%-30%, or 1%-3%, etc. are expressly enumerated in this specification. These are only examples of what is specifically intended, and all possible combinations of numerical values between and including the lowest value and the highest value enumerated are to be considered to be expressly stated in this disclosure.

Unless otherwise defined, all technical terms used herein have the same meaning as commonly understood by one of ordinary skill in the art to which this disclosure belongs.

The functional units described in this specification have been labeled as computing devices. A computing device may be implemented in programmable hardware devices such as processors, digital signal processors, central processing units, field programmable gate arrays, programmable array logic, programmable logic devices, cloud processing systems, or the like. The computing devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together but may comprise disparate instructions stored in different locations which, when joined logically together, comprise the computing device and achieve the stated purpose of the computing device. In another example, a computing device may be a server or other computer located within a retail environment and communicatively connected to other computing devices (e.g., POS equipment or computers) for managing accounting, purchase transactions, and other processes within the retail environment. In another example, a computing device may be a mobile computing device such as, for example, but not limited to, a smart phone, a cell phone, a pager, a personal digital assistant (PDA), a mobile computer with a smart phone client, or the like. In another example, a computing device may be any type of wearable computer, such as a computer with a head-mounted display (HMD), or a smart watch or some other wearable smart device. Some of the computer sensing may be part of the fabric of the clothes the user is wearing. A computing device can also include any type of conventional computer, for example, a laptop computer or a tablet computer. A typical mobile computing device is a wireless data access-enabled device (e.g., an iPHONE® smart phone, a BLACKBERRY® smart phone, a NEXUS ONE™ smart phone, an iPAD® device, smart watch, or the like) that is capable of sending and receiving data in a wireless manner using protocols like the Internet Protocol, or IP, and the wireless application protocol, or WAP. This allows users to access information via wireless devices, such as smart watches, smart phones, mobile phones, pagers, two-way radios, communicators, and the like. Wireless data access is supported by many wireless networks, including, but not limited to, Bluetooth, Near Field Communication, CDPD, CDMA, GSM, PDC, PHS, TDMA, FLEX, ReFLEX, iDEN, TETRA, DECT, DataTAC, Mobitex, EDGE and other 2G, 3G, 4G, 5G, and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone or smart watch that operates over GPRS (General Packet Radio Services), which is a data technology for GSM networks or operates over Near Field Communication e.g. Bluetooth. In addition to a conventional voice communication, a given mobile device can communicate with another such device via many different types of message transfer techniques, including Bluetooth, Near Field Communication, SMS (short message service), enhanced SMS (EMS), multi-media message (MMS), email WAP, paging, or other known or later-developed wireless data formats. Although many of the examples provided herein are implemented on smart phones, the examples may similarly be implemented on any suitable computing device, such as a computer.

An executable code of a computing device may be a single instruction, or many instructions, and may even be distributed over several different code segments, among different applications, and across several memory devices. Similarly, operational data may be identified and illustrated herein within the computing device, and may be embodied in any suitable form and organized within any suitable type of data structure. The operational data may be collected as a single data set, or may be distributed over different locations including over different storage devices, and may exist, at least partially, as electronic signals on a system or network.

The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

As used herein, the term "memory" is generally a storage device of a computing device. Examples include, but are not limited to, read-only memory (ROM) and random access memory (RAM).

The device or system for performing one or more operations on a memory of a computing device may be a software, hardware, firmware, or combination of these. The device or the system is further intended to include or otherwise cover all software or computer programs capable of performing the various heretofore-disclosed determinations, calculations, or the like for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl, or other suitable programming languages.

As referred to herein, the terms "computing device" and "entities" should be broadly construed and should be understood to be interchangeable. They may include any type of computing device, for example, a server, a desktop computer, a laptop computer, a smart phone, a cell phone, a pager, a personal digital assistant (PDA, e.g., with GPRS NIC), a mobile computer with a smartphone client, or the like.

As referred to herein, a user interface is generally a system by which users interact with a computing device. A user interface can include an input for allowing users to manipulate a computing device, and can include an output for allowing the system to present information and/or data, indicate the effects of the user's manipulation, etc. An example of a user interface on a computing device (e.g., a mobile device) includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. A user interface can include an input for allowing users to manipulate a computing device, and can include an output for allowing the computing device to present information and/or data, indicate the effects of the user's manipulation, etc. An example of a user interface on a computing device includes a graphical user interface (GUI) that allows users to interact with programs or applications in more ways than typing. A GUI typically can offer display objects, and visual indicators, as opposed to text-based interfaces, typed command labels or text navigation to represent information and actions available to a user. For example, a user interface can be a display window or display object, which is selectable by a user of a computing device for interaction. The display object can be displayed on a display screen of a computing device and can be selected by and interacted with by a user using the user interface. In an example, the display of the computing device can be a touch screen, which can display the display icon. The user can depress the area of the display screen where the display icon is displayed for selecting the display icon. In another example, the user can use any other suitable user interface of a computing device, such as a keypad, to select the display icon or display object. For example, the user can use a track ball or arrow keys for moving a cursor to highlight and select the display object.

The display object can be displayed on a display screen of a mobile device and can be selected by and interacted with by a user using the interface. In an example, the display of the mobile device can be a touch screen, which can display the display icon. The user can depress the area of the display screen at which the display icon is displayed for selecting the display icon. In another example, the user can use any other suitable interface of a mobile device, such as a keypad, to select the display icon or display object. For example, the user can use a track ball or times program instructions thereon for causing a processor to carry out aspects of the present disclosure.

As referred to herein, a computer network may be any group of computing systems, devices, or equipment that are linked together. Examples include, but are not limited to, local area networks (LANs) and wide area networks (WANs). A network may be categorized based on its design model, topology, or architecture. In an example, a network may be characterized as having a hierarchical internetworking model, which divides the network into three layers: access layer, distribution layer, and core layer. The access layer focuses on connecting client nodes, such as workstations to the network. The distribution layer manages routing, filtering, and quality-of-server (QoS) policies. The core layer can provide high-speed, highly-redundant forwarding services to move packets between distribution layer devices in different regions of the network. The core layer typically includes multiple routers and switches.

FIG. 1 illustrates a block diagram of a system 100 for indicating a geographic location of transportation for a user based on a time when the user is expected to utilize the transportation in accordance with embodiments of the present disclosure. Referring to FIG. 1, the system 100 includes a computing device 102 including a geographic coordinate system (GPS) receiver 104 and/or other suitable hardware, software, firmware, or combinations thereof for determining a position of the computing device 102. In this example, the computing device 102 is carried and operated by a driver 106 of an automobile 108. The computing device 102 may include a user interface 110 configured to present information, data, graphics, and the like. For example, the user interface 110 may include a touchscreen display and one or more speakers. Further, the user interface 110 may be configured to receive input from the user, such as interaction with the touchscreen display of the computing device 102.

The computing device 102 includes a transportation manager 112 configured to determine a geographic location of transportation for a user, to determine an approximate time when the user is expected to utilize the transportation at the geographic location, and to present a message indicating the determined geographic location of the transportation. The functionality described for the transportation manager 112 may entirely or at least partially reside on the computing device 102. For example, the transportation manager 112 may be an application residing on the computing device 102 that may be supported by a remote server 114. The transportation manager 112 may include hardware, software, firmware, or the like for implementing the functionality described herein. For example, the transportation manager 112 may include memory 116 and one or more processors 118 for implementing the functionality described herein.

In accordance with embodiments, the computing device 102 may assist the driver 106 with locating her or his automobile 108 or other transportation. This may be utilized, for example, when the driver 106 is located remote from automobile 108 and needs assistance with finding where she or he parked the automobile 108. In another example, the driver 106 may need assistance with locating another form of transportation location, such as a bus, taxi, airport, train, or the like, when located remotely. More particularly, the computing device 102 may present, via the user interface 110, a message to the driver 106 indicating the geographic location of the automobile 108. Based on this information, the driver 106 may proceed (e.g., by walking or other form of transportation) to the indicated geographic location of the automobile 108 or other transportation location. The user interface 110 may also present directions for travel to the automobile 108 from the driver's 106 current location. The current location of the driver 106 carrying the computing device 102 may be determined by the GPS receiver 104.

In accordance with embodiments, the transportation manager 112 may determine an approximate time when the user is expected to utilize the transportation. This time may be determined based on historical data associated with transportation of the driver 106, calendar entries associated with the driver 106, the like, or combinations thereof. Historical data stored in memory 116, for example, may be indicate when on a particular day the driver 106 can be expected to begin driving the automobile 108. For example, the historical data may indicate that on Mondays-Friday the driver 106 frequently utilizes the automobile 108 beginning at 5:30 pm local time. Based on the information of this example, the transportation manager 112 may determine that at approximately 5:30 pm on Mondays-Friday the driver 106 can be expected to utilize the automobile 108. It is noted that the historical data indicating the driver's 106 usage of the automobile 108 may be stored at the computing device 102, the server 114, or combinations thereof. The transportation manager 112 may be configured to implement suitable artificial intelligence techniques for determining usage or expected usage of the automobile 108 by the driver 106 based on the historical data.

In another example of determining when the user is expected to utilize transportation, the transportation manager 112 may maintain or have access to a calendar for the driver 106. The calendar may be stored in memory 116, at the server 114, or combinations thereof. The calendar may include entries indicating appointments, such as work meetings, of the driver 106. In an example, the transportation manager 112 may determine that the driver 106 can be expected to utilize the automobile 108 immediately following a particular, regularly-scheduled work meeting. In this instance, the transportation manager 112 can recognize or determine that the driver 106 can be expected to utilize the automobile 108 when the same type of meeting is scheduled on the calendar. The transportation manager 112 may be configured to implement suitable artificial intelligence techniques for determining usage or expected usage of the automobile 108 by the driver 106 based on calendar entries.

FIG. 2 illustrates a diagram showing an example scenario of the driver 106 having parked the automobile 108 at geographic location (generally designated 200), walked to a destination (generally indicated 202), and subsequently returned to the automobile 108 in accordance with embodiments of the present disclosure. Referring to FIG. 2, a representation of the driver 106 is shown at three (3) different points in time, which are indicated by TIME 1 204, TIME 2, 206, and TIME 3 208. At TIME 1 204, the driver 106 is depicted as just having parked the automobile 108 and walking to the destination 202 along a route generally designated by arrow 210. At TIME 2 206, the driver 106 is depicted as having arrived at and being within the geographic location of the destination 202. At TIME 3 208, the driver 106 is depicted as walking along a route to the geographic location 200 of the automobile 108.

With continuing reference to FIG. 2, the operation of a computing device for assisting the driver 106 with returning to the automobile 108 is now described. Particularly, the computing device may be a smartphone and when the driver 106 parks the automobile 106 at the geographic location 200, the driver 106 may be carrying the smartphone. The computing device being carried by the driver 106 may determine that the driver 106 has parked the automobile 108. For example, the computing device may include a motion sensing component, such as an accelerometer, to determine the movements of the computing device to deduce that the driver 106 has parked the automobile 108 as will be appreciated by those of skill in the art. In this example, the computing device may determine that the GPS coordinates of this parked location is a geographic location of the automobile 108. These GPS coordinates may be stored in memory for subsequent retrieval for assisting the driver 106 to return to the automobile's 108 geographic location.

Subsequent to parking the automobile 108, the driver 106 may proceed to the geographic location of the destination 202. The destination 202 may be an area at or near a building, such as an office building, a shopping center, an airport terminal, a restaurant, or the like. The driver 106 may stay at the destination 202 for a time period. While at the destination 202, the computing device being carried by the driver 106 may determine an approximate time when the driver 106 is expected to utilize the parked automobile 106. For example, the driver 106 may be at work at an office building located at destination 202. The computing device may determine that the driver 106 most often leaves the office building in order to drive the automobile 108 between 5:00 pm and 5:30 pm. This may be determined based on historical data of when the driver 106 begins walking from the office building to the location of the automobile 108 and also then drives the automobile 108. Since the earliest time that the drive 106 is expected to leave in the time range is 5:00 pm, the computing device can determine the approximate time when the driver 106 is expected to leave the office building for the car is about approximately 5:00 pm. In response to reaching this determined time, the computing device may present to the user, via its user interface, a message indicating the determined geographic location of the automobile 108. For example, the computing device may display a message that indicates the location (e.g., parking deck identifier or street name) where the parked automobile 108 is located. Also, for example, the computing device may display directions for the driver 106 to walk to the parked automobile 108 from his or her current location, such as from the destination 202.

FIG. 3 illustrates a flow diagram of a method for indicating a geographic location of transportation for a user based on a time when the user is expected to utilize the transportation in accordance with embodiments of the present disclosure. The method is described by example as being implemented by the system 100 shown in FIG. 1, although it should be understood that the method may be implemented by any other suitable system operable to determine a geographic location of a computing device.

Referring to FIG. 3, the method includes determining 300 a geographic location of transportation for a user. For example referring to FIG. 1, the transportation manager 112 of the computing device (e.g., smartphone) 102 may determine a geographic location of transportation for the driver 106. As an example, the transportation manager 112 may determine that the drive 106 has parked the automobile 108 based on motions detected by the accelerometer or other motioning sensing component of the computing device 102. In another example, the driver 106 may interact with the user interface 110 to indicate that the automobile 108 has been parked. In this example, the transportation manager 112 may log the current geographic coordinates as the geographic location of the parked automobile 108. In yet another example, geographic coordinates indicating the location of the automobile 108 may be received from the server 114 or any other suitable source. The determined geographic location information or data may be stored in memory 116.

The method of FIG. 3 includes determining 302 an approximate time when the user is expected to utilize the transportation at the geographic location. Continuing the aforementioned example, the transportation manager 112 may determine an approximate time when the driver 106 is expected to utilize the automobile 108 at its geographic location, which is generally indicated by the broken-lined rectangle 120. The transportation manager 112 may determine the time based on historical data associated with use of the automobile 108 and/or calendar entries as disclosed by examples provided herein.

The method of FIG. 3 includes presenting 304, via a computing device of the user and based on the determined approximate time, a message that indicates the determined geographic location of the transportation. Continuing the aforementioned example, the computing device 102 may control the user interface 110 to present a message that indicates the determined geographic location of the automobile 108 (e.g., the coordinates of the destination 120 where the automobile 108 is determined to be parked). For example, the computing device 102 may control a display of the user interface 110 to display a message indicating the location (e.g., parking deck identifier or street name) where the parked automobile 108 is located. Also, for example, the computing device 102 may use the display of the user interface 110 to display directions for the driver 106 to walk to the parked automobile 108 from his or her current location.

FIG. 4 illustrates a flow diagram of a method for indicating a geographic location of transportation for a user based on a time when the user is expected to utilize the transportation in accordance with embodiments of the present disclosure. The method is described by example as being implemented by the system 100 shown in FIG. 1, although it should be understood that the method may be implemented by any other suitable system operable to determine a geographic location of a computing device.

Referring to FIG. 4, the method includes receiving 400, at a user interface, user input for configuring an application to indicate a geographic location of a user's automobile based on a time when the user is expected to utilize the automobile. For example referring to FIG. 1, the user 106 may interact with her or his smartphone (which is the computing device 102 in this example) to initialize an application (e.g., the transportation manager 112) residing on the computing device 102 and that can manage notifying the user 106 of the location of the automobile 108. The user 106 may desire to be notified of the location of the automobile 108 at approximately the time the user 106 leaves her or his workplace. The user 106 may use the user interface 110 to set the application to notify the user 106 via the user interface 106 at the time the user expects to leave his or her workplace's office building. For example, the user 106 may set the application to present the notification at 5:00 pm on each day Monday-Friday.

In one example, the application may provide a calendar that can include entries indicating the user's 106 schedule of leaving work or any other indicator of when the user 106 may be returning to the parked automobile 108. In this example, the application's calendar can be accessed for determining when to notify the user 106 of the parked automobile 108 based on the calendar entries. In another example, the calendar may be separately maintained by a different service, such as at a schedule assistant application 122 residing at the server 114. The schedule assistant application 122 may be implemented by hardware, software, firmware, or combinations thereof. For example, the schedule assistant application 122 may be implemented by memory 124 and one or more processors 126. The application residing on the computing device 102 may have authorization for accessing the server 114 to retrieve entries in the calendar for the user 106 stored at the server 114, such as entries indicating when the user 106 is expected to return to the parked automobile 108. The computing device 102 and the server 114 may communicate via one or more networks 128, such as the Internet and cellular networks.

The method of FIG. 4 includes determining 402 a geographic location of where the user parked the automobile. Continuing the aforementioned example, subsequent to the application on the computing device 102 being configured, the transportation manager 112 may receive user input via the user interface 110 that indicates that the user 106 has parked the automobile 108. The user 106 may interact with the application via the user interface 106 after parking the automobile 108 to walk to the workplace office building for indicating that the automobile 108 has been parked. Upon receiving notification that the automobile 108 has been parked, the application may access the GPS receiver 104 to retrieve the current coordinates of the computing device 102. The application may deduce that these current coordinates indicate the geographic location 120 of the parked automobile 108, or at least sufficiently near the automobile 108 such that the user 106 could be reminded of the location. Alternatively, for example, a motion sensing component (e.g., an accelerometer) may be used to deduce the parked location of the automobile 108 based on a travel speed (indicated by use of the GPS receiver 104) and motions indicating walking by the user 106 while carrying the computing device 106. This information from the motion sensing component, the GPS receiver 104, and/or other components may be used to deduce the location of the parked automobile 108, and the geographic location may be stored in memory 116 for later retrieval.

The method of FIG. 4 includes determining 404 an end time of an event after when the user is expected to utilize the parked automobile. Continuing the aforementioned example, the application residing on the computing device 102 may access the user's 106 configuration that indicates the user can be expected to leave his or her workplace's office building at 5:00 pm on each day Monday-Friday. The application can compare this expected time of leaving to the current time. Upon determining that the current time is 5:00 pm on any of Monday-Friday, the application may determine that it is currently or approximately the time when the user 106 can be expected to begin walking to the parked automobile 108.

The method of FIG. 4 includes determining 406 an amount of time needed for the user to travel from the user's current location to the geographic location of the parked automobile. Continuing the aforementioned example, the application of the computing device 102 can determine current geographic coordinates of the user 106 and the parked automobile 108. The application may subsequently determine or estimate time needed for a person or the user 106 to walk or otherwise travel to the parked automobile 108 based on a distance between the geographic coordinates of the user 106 and the parked automobile 108.

The method of FIG. 4 includes presenting 408, via the user interface of the computing device, a message that indicates the geographic location of the parked automobile at least the determined amount of time needed prior to the determined end time of the event. Continuing the aforementioned example, on a particular weekday such as Tuesday, the application may have determined that the driver 106 is expected to utilize her or his automobile 108 at 5:00 pm. In advance of this time, the application may determine that 10 minutes are needed for the driver 106 to walk from his or her current position to the parked automobile 108. In this instance, the application can provide notification of the geographic location of the parked automobile 108 at least 10 minutes in advance of 5:00 pm, such that the driver 106 would know the parked automobile's 108 location prior to beginning to walk to the automobile 108 at the expected time to utilize the automobile 108. The notification or message may be presented by the application to the driver 10 via, for example, a text message, an email, a voicemail message, and/or the like. One or more of these notifications may be communicated by the server 114 to the computing device 102. The notification may include the indication of the determined geographic location of the parked automobile 108 or other mode of transportation.

FIG. 5 illustrates a flow diagram of a method for indicating a geographic location of transportation for a user based on an activity pattern of the user in accordance with embodiments of the present disclosure. The method is described by example as being implemented by the system 100 shown in FIG. 1, although it should be understood that the method may be implemented by any other suitable system operable to determine a geographic location of a computing device.

Referring to FIG. 5, the method includes initializing 500 an application on a computing device for indicating a geographic location of a user's automobile based on a time when the user is expected to utilize the automobile. For example referring to FIG. 1, the user 106 may interact with her or his smartphone (which is the computing device 102 in this example) to load and initialize an application (e.g., the transportation manager 112) residing on the computing device 102 and that can manage notifying the driver 106 of the location of the automobile 108. The application may be configured to monitor activity patterns of the driver 106 for determined when these patterns are predictive of when the driver 106 can be expected to utilize the automobile 108. Such activity patterns may include, but are not limited to, indications when the smartphone is wirelessly connected and becomes disconnected to the automobile, movements of the smartphone in accordance with examples provided herein, and the like. In one example, application may determine that when the user begins moving along a particular pathway, then the user can be expected to soon be using the automobile. For example, the application may determine and store coordinates of an automobile when the automobile is parked at an airport, which may include multiple parking decks. Thus when utilizing the airport for travel, the user may park her or his car at any of the parking decks and need assistance with finding the parked automobile upon returning from travel.

The method of FIG. 5 includes determining 502 a geographic location of where the user parked the automobile. Continuing the aforementioned example, the application may determine where the automobile 108 is parked among the different parking garages of the airport. Further, the application may store the coordinates of this location or some identifier of the parking deck (e.g., a parking deck letter or number) in memory 116.

The method of FIG. 5 includes determining 504 an activity pattern of the user associated with use of the automobile. Continuing the aforementioned example, the application may determine an activity pattern of the driver 106. For example, the application may use motion sensing components, the GPS receiver 104, and/or the like to determine that the driver 106 parked the automobile 108 at one of the parking decks and that the driver 106 is walking from a terminal at the airport towards the parking decks. Based on this determination, the application may determine that this activity pattern is associated with an upcoming use of the automobile 108. Particularly, it may be deduced that the driver 106 is walking towards the automobile 108 in order to drive the automobile away from the airport.

The method of FIG. 5 includes presenting 506, via a user interface of the computing device, a message that indicates the geographic location of the parked automobile. Continuing the aforementioned example, the computing device 102 may use the user interface 110 to present an indication of which parking deck the automobile 108 is located in. The computing device 102 may present this indication in response to determining that the driver is walking towards the parking decks from the airport terminal.

FIG. 6 illustrates a flow diagram of a method for notifying a user when to travel to a mode of transportation in accordance with embodiments of the present disclosure. The method is described by example as being implemented by the system 100 shown in FIG. 1, although it should be understood that the method may be implemented by any other suitable system operable to determine a geographic location of a computing device.

Referring to FIG. 6, the method includes determining 600 an approximate time when a user is expected to use a mode of transportation. Referring to the example of FIG. 1, the transportation manager 112 may determine an approximate time when the user 106 is expected to use the automobile 108. The time may be determined based on a schedule and/or activity pattern of the user 106, such as a time when the user has a meeting scheduled at a different location.

The method of FIG. 6 includes determining 602 an estimated time to travel from a current geographic location of the user to a current geographic location of the mode of transportation. Continuing the aforementioned example, the transportation manager 112 may determine the estimated time to travel from the user's 106 geographic location to the automobile 108. The current user location may be determined by use of the GPS receiver 104. The current geographic location of the automobile may be determined in accordance with examples provided herein. For example, the current geographic location of the automobile 108 may be determined by using the geographic GPS receiver 104 of the computing device at a previous use by the user 106 when parking the automobile 108. In another example, the transportation manager 112 may determine an estimate of time for walking from the user's current geographic location to the current geographic location of the automobile 108 for determining the estimated time for traveling to the mode of transportation.

The method of FIG. 6 includes presenting 604, via a computing device of the user, a message at a time based on the determined approximate time and the determined estimated time. Continuing the aforementioned example, the transportation manager 112 may user the user interface 110 to present the message. In an example, the message may be presented at least prior to a start time determined for the user to begin traveling to the transportation. This start time may be a time when the user 106 is determined to need to begin traveling to the mode of transportation in order to have sufficient time to use the mode of transportation to arrive at a scheduled event or meeting on time.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network, or Near Field Communication. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++, Javascript or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:
1. A method comprising:
  determining an approximate time when a user is expected to use a mode of transportation;
  determining an estimated time to travel from a current geographic location of the user to a current geographic location of the mode of transportation; and
  presenting, via a computing device of the user, a message at a time based on the determined approximate time and the determined estimated time.

2. The method of claim 1, wherein determining the estimated time to travel comprises determining the current geographic location of an automobile of the user.

3. The method of claim 2, wherein determining the current geographic location of the automobile comprises determining a geographic location of where the automobile was parked.

4. The method of claim 1, further comprising determining the current geographic location of the mode of transportation using a geographic coordinate system (GPS) receiver of the computing device at a previous use by the user of the mode of transportation.

5. The method of claim 1, wherein determining the estimated time comprises determining an estimate of time for walking from the current geographic location of the user to the current geographic location of the mode of transportation.

6. The method of claim 1, further comprising accessing historical data indicative of previous times of use of a mode of transportation, and
wherein determining an approximate time comprises determining the approximate time when the user is expected to use the mode of transportation based on the historical data.

7. The method of claim 1, further comprising determining a start time for the user to begin traveling to the mode of transportation, wherein the start time is determined based on a needed time to use the mode of transportation to arrive at a scheduled event or meeting on time, and
wherein presenting the message comprises presenting the message at least prior to the start time.

8. A computer program product comprising a non-transitory computer readable storage medium having program instructions embodied therewith, the program instructions executable by a computing device to cause the computing device to:
determine an approximate time when a user is expected to use a mode of transportation;
determine an estimated time to travel from a current geographic location of the user to a current geographic location of the mode of transportation; and
present a message at a time based on the determined approximate time and the determined estimated time.

9. The computer program product of claim 8, wherein the program instructions are executable by a computing device to cause the computing device to determine the current geographic location of an automobile of the user.

10. The computer program product of claim 9, wherein the program instructions are executable by a computing device to cause the computing device to determine a geographic location of where the automobile was parked.

11. The computer program product of claim 8, wherein the program instructions are executable by a computing device to cause the computing device to determine the current geographic location of the mode of transportation using a geographic coordinate system (GPS) receiver of the computing device at a previous use by the user of the mode of transportation.

12. The computer program product of claim 8, wherein the program instructions are executable by a computing device to cause the computing device to determine an estimate of time for walking from the current geographic location of the user to the current geographic location of the mode of transportation.

13. The computer program product of claim 8, wherein the program instructions are executable by a computing device to cause the computing device to determine an activity pattern of the user associated with use of the mode of transportation.

14. The computer program product of claim 8, wherein the program instructions are executable by a computing device to cause the computing device to:
determine a start time for the user to begin traveling to the mode of transportation, wherein the start time is determined based on a needed time to use the mode of transportation to arrive at a scheduled event or meeting on time; and
present the message at least prior to the start time.

15. A computing device comprising:
a transportation manager configured to:
determine an approximate time when a user is expected to use a mode of transportation;
determine an estimated time to travel from a current geographic location of the user to a current geographic location of the mode of transportation; and
present a message at a time based on the determined approximate time and the determined estimated time.

16. The computing device of claim 15, wherein the transportation manager is configured to determine the current geographic location of an automobile of the user.

17. The computing device of claim 16, wherein the transportation manager is configured to determine a geographic location of where the automobile was parked.

18. The computing device of claim 15, wherein the transportation manager is configured to determine an estimate of time for walking from the current geographic location of the user to the current geographic location of the mode of transportation.

19. The computing device of claim 15, wherein the transportation manager is configured to determine an activity pattern of the user associated with use of the mode of transportation.

20. The computing device of claim 15, wherein the transportation manager is configured to:
determine a start time for the user to begin traveling to the mode of transportation, wherein the start time is determined based on a needed time to use the mode of transportation to arrive at a scheduled event or meeting on time; and
present the message at least prior to the start time.

* * * * *